(12) United States Patent
Ennis

(10) Patent No.: US 8,112,839 B2
(45) Date of Patent: Feb. 14, 2012

(54) SYNTHETIC GRASS CLEANING ELEMENT FOR VEHICLE WASHING APPARATUS

(76) Inventor: G Thomas Ennis, Inglewood, CA (US)

( * ) Notice: Subject to any disclaimer, the term of this patent is extended or adjusted under 35 U.S.C. 154(b) by 506 days.

(21) Appl. No.: 12/323,709

(22) Filed: Nov. 26, 2008

(65) Prior Publication Data

US 2010/0125965 A1    May 27, 2010

(51) Int. Cl.
*B05C 1/00*    (2006.01)
(52) U.S. Cl. ............ 15/97.3; 15/230; 15/209.1; 15/215; 15/217; 15/238
(58) Field of Classification Search ............ 15/97.3, 15/230, 230.11, 230.12, 230.14, 230.15, 15/230.16, 230.17, 230.18, 230.19, 215, 15/217, 238, 244.1, 179, 207.2, DIG. 2
See application file for complete search history.

(56) References Cited

U.S. PATENT DOCUMENTS

| | | | | |
|---|---|---|---|---|
| 3,147,503 A | * | 9/1964 | Charvat | 15/179 |
| 4,069,536 A | * | 1/1978 | Hartz et al. | 15/104.92 |
| 4,288,255 A | * | 9/1981 | Burger | 134/6 |
| 4,377,878 A | * | 3/1983 | Pecora | 15/97.3 |
| 4,815,158 A | * | 3/1989 | Crotts | 15/53.2 |
| 5,077,859 A | | 1/1992 | Ennis | |
| 5,461,745 A | * | 10/1995 | Nittoli | 15/97.3 |
| 5,946,761 A | * | 9/1999 | Ennis | 15/230.16 |
| 6,299,959 B1 | * | 10/2001 | Squires et al. | 428/87 |
| 7,152,269 B1 | * | 12/2006 | Windel | 15/181 |
| 7,331,079 B2 | | 2/2008 | Ennis | |
| 2003/0115701 A1 | * | 6/2003 | Edwards | 15/159.1 |

* cited by examiner

*Primary Examiner* — Robert Scruggs
(74) *Attorney, Agent, or Firm* — Mattingly & Malur, P.C.

(57) ABSTRACT

A cleaning element for washing a vehicle includes a support having a layer of synthetic grass material mounted thereto. The support maybe a rotatable support which forms a rotary brush. The cleaning element also may be a solid curtain of synthetic grass material or a curtain formed into individual strips of synthetic grass material.

6 Claims, 5 Drawing Sheets

SYNTHETIC GRASS CLEANING ELEMENT FOR VEHICLE WASHING APPARATUS

BACKGROUND OF THE INVENTION

1. Field of the Invention

The present invention relates to an improved cleaning element for washing a vehicle and, more particularly, to a cleaning element employing synthetic grass material to contact a surface being cleaned.

2. Description of the Related Art

Various types of cleaning elements have heretofore been known for washing a vehicle. The cleaning elements use various types of materials to contact the surface of the vehicle. One such material is described in my U.S. Pat. No. 5,077,859 which discloses a cleaning element for washing a vehicle carried by at least one moveable support with the cleaning element being made of a deep pile, fur-like material. Other types of cleaning elements include rotary brushes having strips of felt material or elongated bristles of plastic material attached thereto.

There still remains a need for a cleaning element for washing a vehicle which is durable, which effectively cleans the surface of a vehicle without scratching the finish and which does not hold too much water so that the cleaning element becomes too heavy.

SUMMARY OF THE INVENTION

It is the object of the present invention to provide a cleaning element for washing a vehicle which includes a synthetic grass material for contacting a vehicle.

Another object of the present invention is to provide a cleaning element for washing a vehicle which is relatively soft on the vehicle surface but which has enough abrasive qualities to clean the surface without scratching or otherwise damaging the surface.

A further object of the invention is to provide a cleaning element for washing a vehicle which does not retain too much water so that the cleaning element becomes too heavy and causes damage to the vehicle surface.

A still further object of the invention is to provide a cleaning element for washing a vehicle which includes a synthetic grass material having dense clusters of small filaments which clean all crevasses and other hard to reach places on the surface of a vehicle.

The present invention achieves the above and other objects by providing a cleaning element for washing a vehicle which includes a support having a synthetic grass material mounted thereto. The synthetic grass material includes a base having dense clusters of filaments upstanding therefrom with a preferred length of each filament being approximately 1 inch. The support may be a rotatable support with a layer of the synthetic grass material mounted thereon to form a rotary brush for contacting a vehicle. In another embodiment, the support of the cleaning element maybe an elongated member such as a frame member and the synthetic grass material is in the form of a scrubber curtain attached to the elongated member. The scrubber curtain may be divided into a plurality of individual strips. In still another embodiment, the curtain is constructed of a layer of synthetic grass material folded over on itself to form a double layer.

These, together with other objects and advantages, which will be subsequently apparent, reside in the details of construction and operation as more fully described in the claims hereafter, reference being made to the accompanying drawings forming a part hereof, wherein like numerals refer to like parts throughout.

DETAILED DESCRIPTION OF THE PREFERRED EMBODIMENTS

Figure 1:
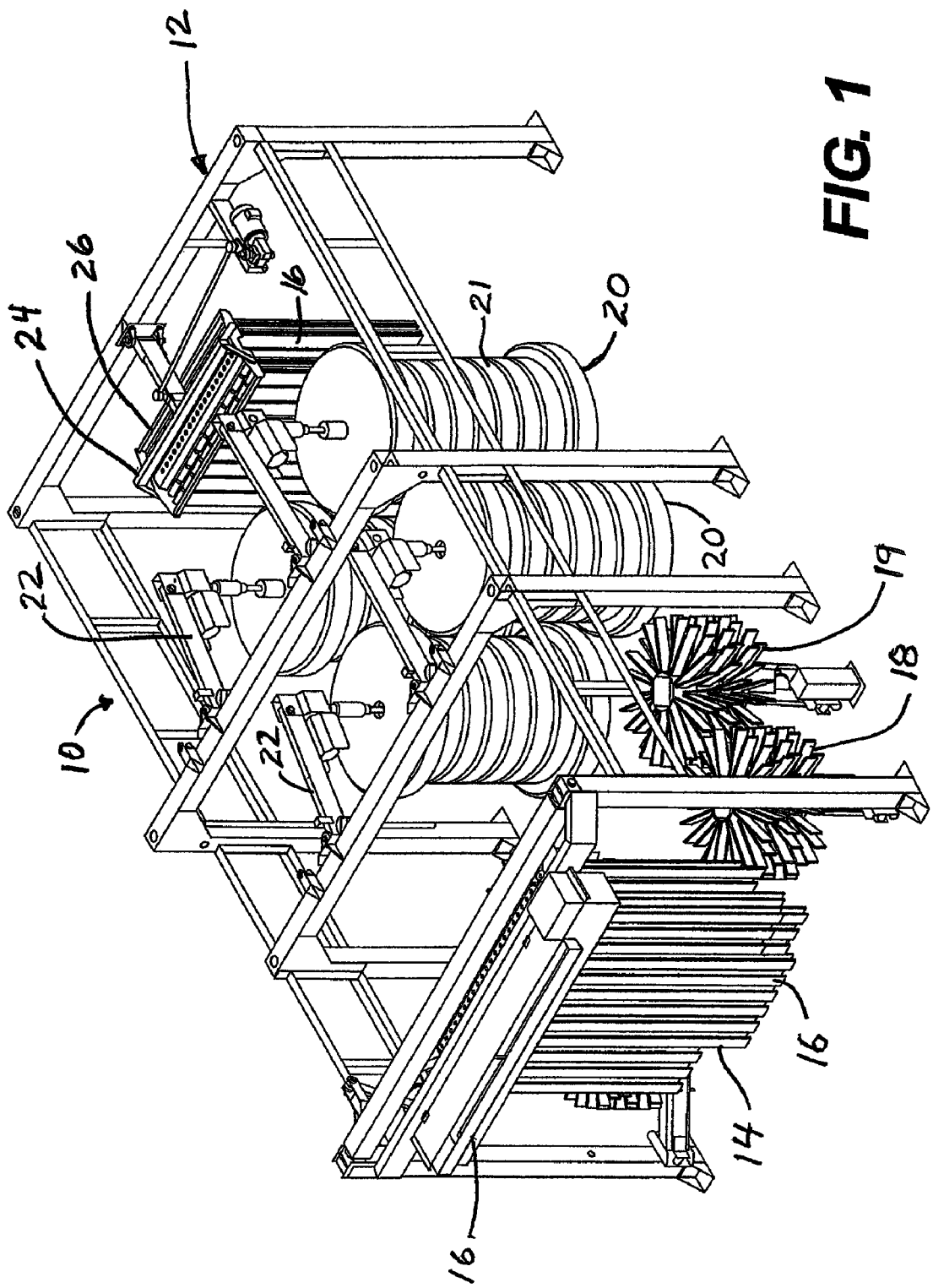
FIG. 1 is a perspective view of a vehicle washing apparatus having several different cleaning elements according to the present invention.

Shown in FIG. 1 of the drawings is a vehicle washing apparatus, generally indicated by the numeral 10, which includes a supporting frame 12 extending over the path or position of a vehicle to be washed. The frame supports a plurality of different cleaning elements.

Thus, the vehicle washing apparatus 10 includes a first scrubbing curtain 14 provided at the front of the frame 12, a plurality of rotary rocker panel brushes 18, two pairs of wrap around rotary brushes 24 and a second scrubber curtain 48 at the rear of the frame 12. This apparatus is fully described in my co-pending U.S. application Ser. No. 12/219,651 which is incorporated herein by reference.

Figure 4:
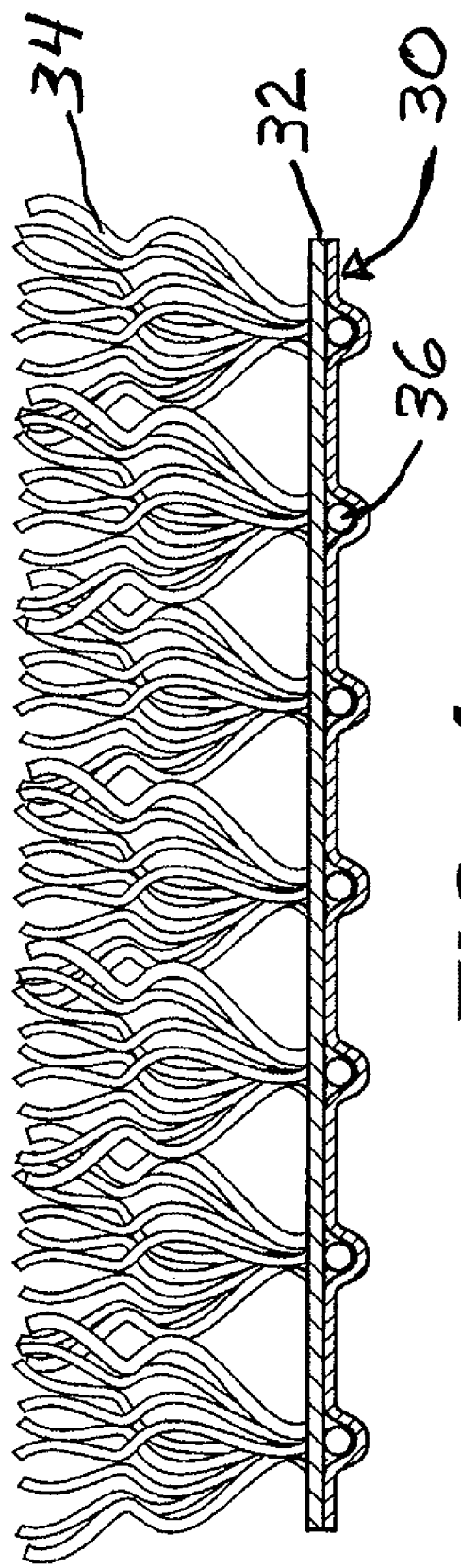
FIG. 4 is a cross-sectional side elevational view of a segment of a synthetic grass material used in cleaning elements of the present invention.

All of the cleaning elements are provided with a synthetic grass material 30 employed as the material for contacting the surface of the vehicle during a cleaning operation. As shown in FIG. 4, the synthetic grass material 30 includes a base 32 having a plurality of filaments 34 in dense clusters upstanding therefrom. A plurality of beads or ridges 36 maybe molded into the base to support the bottoms of the filaments.

The synthetic grass material 30 is constructed of a suitable plastic material such as nylon or polyethylene or a combination of the two. Suitable synthetic grass materials, also referred to as artificial grass or artificial turf, are made by SYNLawn. A particularly suitable synthetic grass material made by SYNLawn is designated SYNBERMUDA PLATINUM 300 and is constructed of EPN nylon and has filaments which extend out from the base approximately 1 inch. The filaments are small in diameter, thus enabling them to get into crevasses and the like on a surface of a vehicle to provide excellent cleaning capability.

Moreover, the synthetic grass material with the small filaments is relatively soft on a vehicle surface so that it does not scratch the surface but is yet just abrasive enough to clean well by dislodging dirt and other grime from the surface of the vehicle. A further advantage of the synthetic grass material is that it does not retain a lot of water. Therefore a cleaning element employing a synthetic grass material does not become heavy and weigh down the cleaning element to cause excessive wear and tear.

The first scrubber curtain 14 and the second scrubber curtain 24 are both divided into a plurality of strips 16 made of the synthetic grass material. In the embodiment showing in FIG. 1, the strips 16 extend downwardly and are suspended from an elongated support member 16. The scrubber curtain 14 maybe reciprocated forwardly and backwardly or from side to side by suitable motor means. In the second scrubber curtain 24, the strips 16 extend downwardly and are suspended from an elongated member or frame 26. The scrubber unit also may be mounted for reciprocating movement forwardly and backwardly or from side to side by suitable motor means.

The rotary rocker panel brushes 18 are also provided with a plurality of strips 19 extending generally horizontally out from the center of each brush and are constructed of the synthetic grass material. The wrap around rotary brushes 20 are also provided with an outer layer 21 of synthetic grass material.

Figure 2:
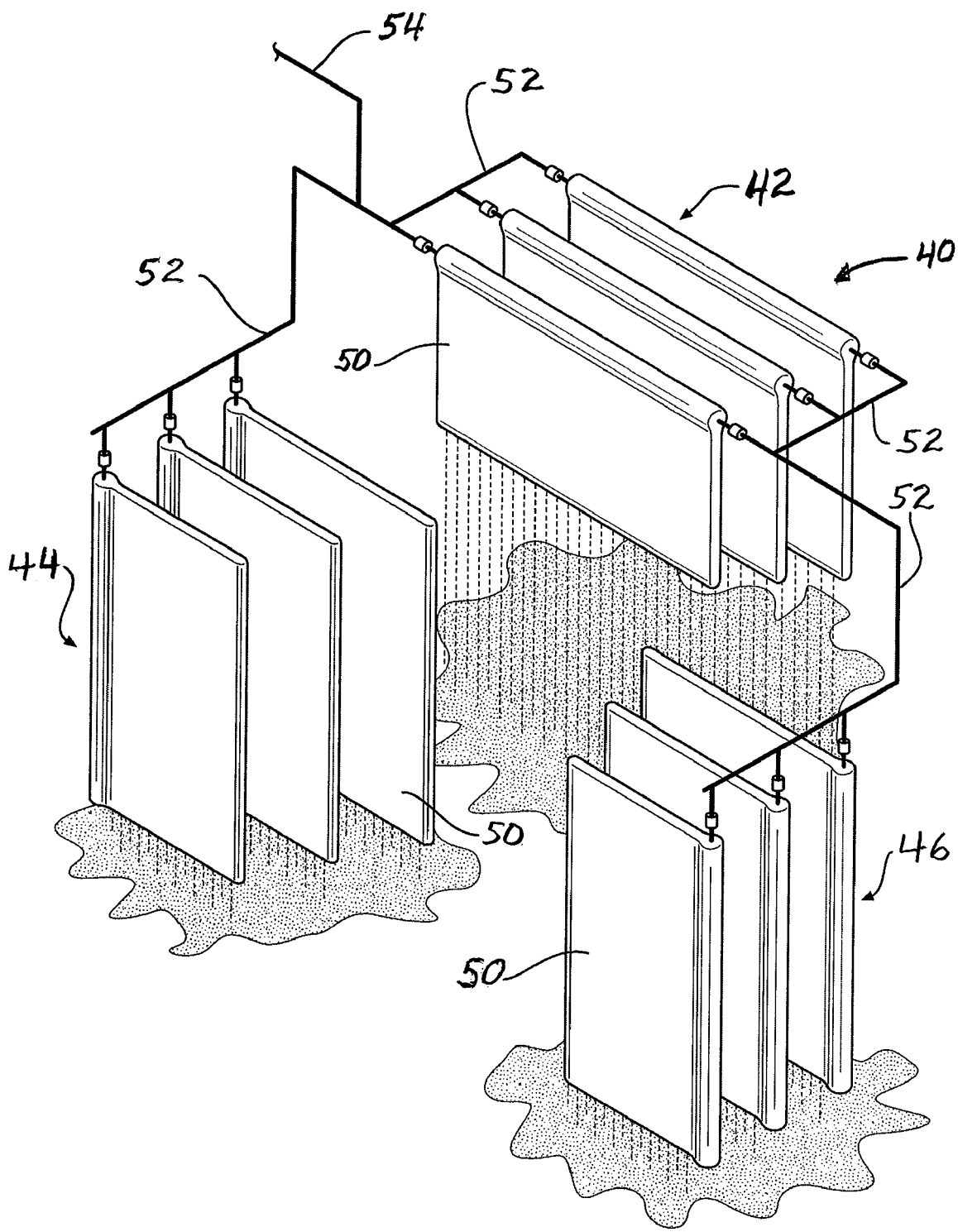
FIG. 2 is a perspective view of another vehicle washing apparatus employing a plurality of sets of curtain cleaning elements constructed according to the present invention.

Another vehicle washing apparatus, generally indicated by the numeral 40, is shown in FIG. 2 which is comprised of a plurality of solid curtains or panels 50 for washing a vehicle. This apparatus is fully described in my U.S. Pat. No. 7,331,079 issued Feb. 19, 2008 which is incorporated herein by reference. The frame of the vehicle washing apparatus is not shown but only the arrangement of curtains or panels and piping. A first set of curtain cleaning elements 42 is mounted centrally at the top of the apparatus, a second set 44 of curtain cleaning elements is mounted to one side of the apparatus and a third set 46 of curtain cleaning elements is mounted to an opposite side of the apparatus. Each of the curtain cleaning elements 50 is pivotally mounted to a frame so that the elements pivot in the direction of a vehicle moving through the apparatus.

As further shown in FIG. 2, a plurality of connected liquid distributing pipes 52 are provided for distributing a liquid from a liquid supply source 54 to each of the cleaning elements 50. The distributing pipes 52 are connected together to form a network of pipes. The liquid maybe water and/or soap or other cleaning solutions.

Figure 3:
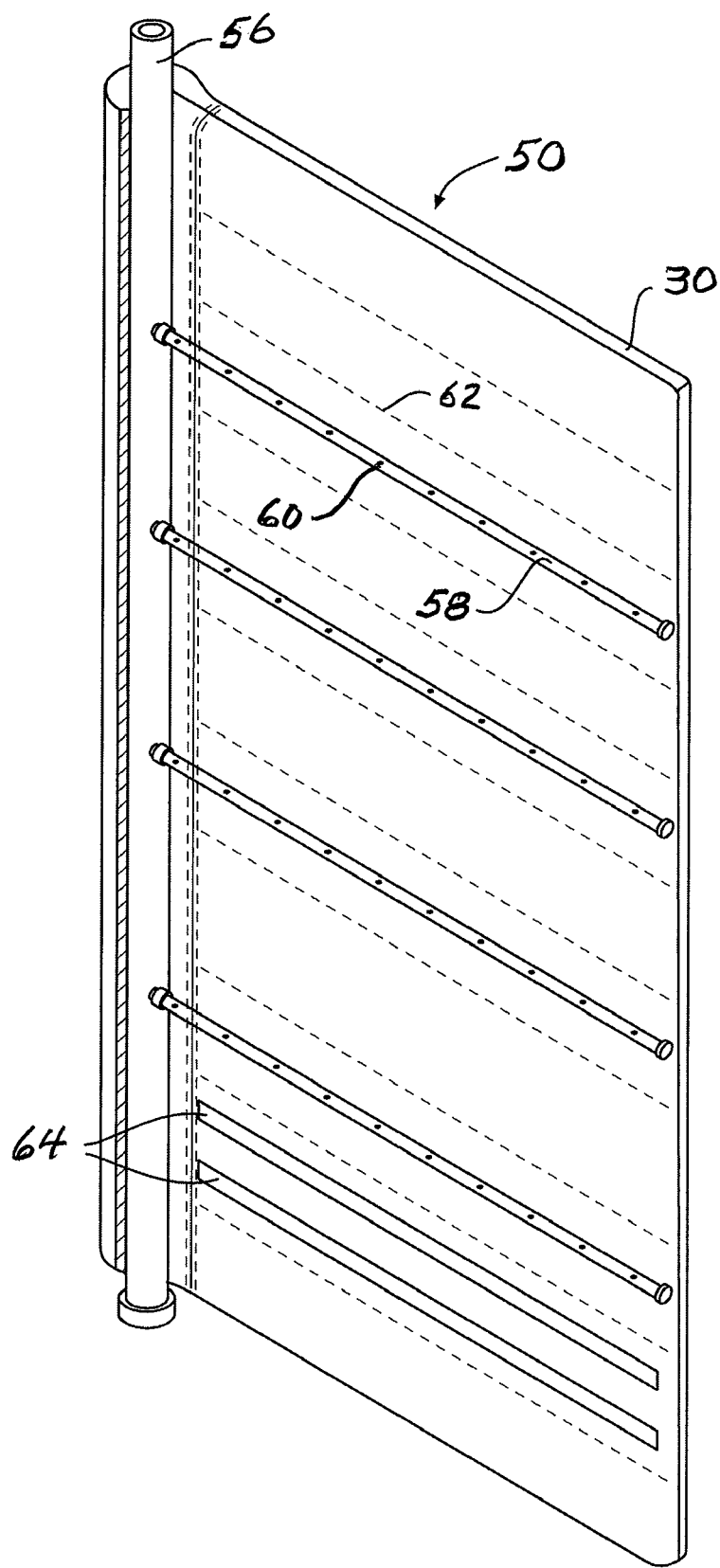
FIG. 3 is a perspective view, partially broken away, of a curtain cleaning element of the vehicle cleaning apparatus of FIG. 2, showing the inside construction of the cleaning element.
Figure 5:
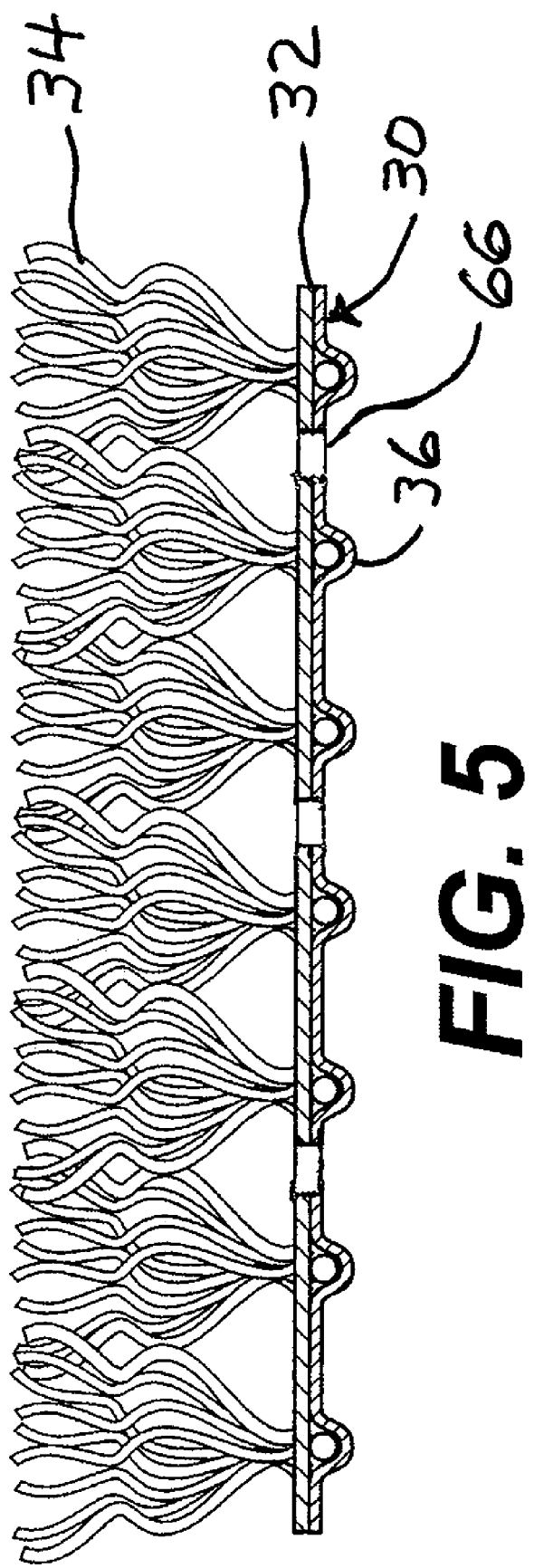
FIG. 5 is a cross sectional side elevational view of a segment of a synthetic grass material having openings therein extending through the base also used in cleaning elements of the present invention.

Each cleaning element 50 is comprised of a blanket of material folded over on itself as shown in the partial broken way view of FIG. 3. Each curtain is comprised of the synthetic grass material as previously described. As further shown in FIG. 3, each curtain is mounted around a main pipe 56 which distributes water to a plurality of secondary pipes 58 having discharge openings 60 therein to distribute liquid throughout the cleaning curtain element. As shown in FIG. 5, the synthetic grass material is provided with a plurality of holes or openings 66 therein whereby liquid may flow through the holes to the outside of the synthetic grass material in order to wash a vehicle.

The folded over layers of synthetic material are stitched together by stitching 62 to form pockets for containing each of the secondary pipes 58.

The various pipes are connected together to form a solid frame work for maintaining the curtain cleaning elements relatively stable. If desired, additional stiffening members 64 may be inserted between the layers of the curtain as shown in the lower portion of FIG. 3.

Numerous other modifications and adaptations of the present invention will be apparent to those skilled in the art, and thus, it is intended by the following claims, to cover all such modifications and adaptations which fall within the true spirit and scope of the invention.

What is claimed is:

1. A vehicle washing apparatus comprising:
   a frame extending over a path or position of a vehicle to be washed; and
   a cleaning element attached to said frame;
   said cleaning element comprising a support and a synthetic grass material mounted to said support; and
   wherein said synthetic grass material is constructed of plastic material and is comprised of a base having filaments in dense clusters upstanding therefrom.

2. The vehicle washing apparatus according to claim 1 wherein said support is a rotatable support and said synthetic grass material is mounted around said rotatable support to form a rotary brush.

3. The vehicle washing apparatus according to claim 1 wherein said support is an elongated member and said synthetic grass material is a scrubber curtain attached to said elongated member.

4. The vehicle washing apparatus according to claim 3 wherein said scrubber curtain is comprised of a plurality of strips.

5. The vehicle washing apparatus according to claim 3 wherein said scrubber curtain is comprised of a layer of said synthetic grass material folded over on itself over the entire layer to form a double layer.

6. The cleaning element according to claim 1 wherein said filaments extend out from said base approximately one inch.

* * * * *